US012625053B2

(12) United States Patent
Furukawa

(10) Patent No.: US 12,625,053 B2
(45) Date of Patent: May 12, 2026

(54) MICROPARTICLE SORTING DEVICE AND MICROPARTICLE SORTING METHOD

(71) Applicant: Sony Group Corporation, Tokyo (JP)

(72) Inventor: Masahide Furukawa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 643 days.

(21) Appl. No.: 18/016,510

(22) PCT Filed: Apr. 20, 2021

(86) PCT No.: PCT/JP2021/015969
§ 371 (c)(1),
(2) Date: Jan. 17, 2023

(87) PCT Pub. No.: WO2022/024477
PCT Pub. Date: Feb. 3, 2022

(65) Prior Publication Data
US 2023/0296488 A1 Sep. 21, 2023

(30) Foreign Application Priority Data

Jul. 28, 2020 (JP) ................................. 2020-127145

(51) Int. Cl.
*G01N 21/64* (2006.01)
*B01L 3/00* (2006.01)
(Continued)

(52) U.S. Cl.
CPC .... *G01N 15/1404* (2013.01); *B01L 3/502761* (2013.01); *B01L 2200/0652* (2013.01);
(Continued)

(58) Field of Classification Search
CPC ............. G01N 15/1404; G01N 15/149; G01N 2015/1411; G01N 2015/142;
(Continued)

(56) References Cited

U.S. PATENT DOCUMENTS 6,133,044 A 10/2000 Engh
6,473,171 B1 10/2002 Buttry et al.
(Continued)

FOREIGN PATENT DOCUMENTS

CN 101581728 A 11/2009
CN 107051911 A 8/2017
(Continued)

OTHER PUBLICATIONS

International Search Report and English translation thereof mailed Jul. 20, 2021 in connection with International Application No. PCT/JP2021/015969.

*Primary Examiner* — Jennifer Wecker
*Assistant Examiner* — Oyeleye Alexander Alabi
(74) *Attorney, Agent, or Firm* — Wolf, Greenfield & Sacks, P.C.

(57) ABSTRACT

To provide a technique capable of forming stable droplets. There is provided a microparticle sorting device including a microchip including a main flow path through which a liquid containing a microparticle flows, a sheath liquid flow path that communicates with the main flow path and through which a sheath liquid flows, and a sheath liquid introduction portion that introduces the sheath liquid, in which the sheath liquid flowing through the sheath liquid introduction portion is vibrated. Furthermore, there is also provided a microparticle sorting method including, in a microchip including at least a main flow path through which a liquid containing a microparticle flows, a sheath liquid flow path that communicates with the main flow path and through which a sheath liquid flows, and a sheath liquid introduction portion that introduces the sheath liquid, vibrating the sheath liquid flowing through the sheath liquid introduction portion.

20 Claims, 8 Drawing Sheets

(51) Int. Cl.

| | |
|---|---|
| *B82Y 5/00* | (2011.01) |
| *B82Y 30/00* | (2011.01) |
| *B82Y 40/00* | (2011.01) |
| *C07F 5/02* | (2006.01) |
| *C09B 57/00* | (2006.01) |
| *C09K 11/06* | (2006.01) |
| *G01N 1/30* | (2006.01) |
| *G01N 15/10* | (2024.01) |
| *G01N 15/1404* | (2024.01) |
| *G01N 15/1409* | (2024.01) |
| *G01N 15/1429* | (2024.01) |
| *G01N 15/149* | (2024.01) |
| *G01N 27/626* | (2021.01) |
| *G01N 31/22* | (2006.01) |
| *G01N 33/483* | (2006.01) |
| *G01N 33/543* | (2006.01) |
| *G01N 33/58* | (2006.01) |
| *G01N 33/68* | (2006.01) |

(52) U.S. Cl.
CPC . *B01L 2300/088* (2013.01); *B01L 2400/0433* (2013.01); *G01N 2015/1411* (2013.01); *G01N 2015/142* (2013.01); *G01N 15/149* (2024.01)

(58) Field of Classification Search
CPC ........... G01N 15/1459; G01N 15/1484; G01N 2015/1006; G01N 2015/1406; B01L 3/502761; B01L 2200/0652; B01L 2300/088; B01L 2400/0433; B01L 2200/143; B01L 2400/0487; B01L 3/502776; B01L 3/502784
See application file for complete search history.

(56) References Cited

U.S. PATENT DOCUMENTS

| | | | | |
|---|---|---|---|---|
| 2005/0153458 A1* | 7/2005 | Van den Engh | ... | G01N 15/1404 |
| | | | | 436/63 |
| 2011/0271746 A1* | 11/2011 | Shinoda | ............ | B01L 3/502776 |
| | | | | 73/61.71 |
| 2012/0190129 A1* | 7/2012 | Higashino | ........ | G01N 33/54366 |
| | | | | 436/501 |
| 2015/0057787 A1* | 2/2015 | Muraki | .............. | G01N 15/1484 |
| | | | | 700/166 |
| 2015/0285726 A1* | 10/2015 | Tanase | .................. | B01L 3/0268 |
| | | | | 209/4 |
| 2019/0143330 A1 | 5/2019 | Kanda | | |

FOREIGN PATENT DOCUMENTS

| | | | |
|---|---|---|---|
| JP | H10-507524 A | | 7/1998 |
| JP | 2013-250229 A | | 12/2013 |
| JP | 2017-219521 A | | 12/2017 |
| WO | WO 2015/111293 A1 | | 7/2015 |
| WO | WO 2017/191824 A1 | | 11/2017 |
| WO | WO 2017/212717 A1 | | 12/2017 |

* cited by examiner

VIBRATION

BENT PIEZOELECTRIC    C21
ELEMENT

MICROPARTICLE SORTING DEVICE AND MICROPARTICLE SORTING METHOD

CROSS-REFERENCE TO RELATED APPLICATIONS

This application claims the benefit under 35 U.S.C. § 371 as a U.S. National Stage Entry of International Application No. PCT/JP2021/015969, filed in the Japanese Patent Office as a Receiving Office on Apr. 20, 2021, which claims priority to Japanese Patent Application Number JP2020-127145, filed in the Japanese Patent Office on Jul. 28, 2020, each of which is hereby incorporated by reference in its entirety.

TECHNICAL FIELD

The present technology relates to a microparticle sorting device and a microparticle sorting method.

BACKGROUND ART

Various devices have been developed so far for sorting microparticles, and in particular, a device for sorting cells is called a "cell sorter". In a cell sorter, generally, vibration is applied to a flow cell or a microchip by a vibration element or the like to form fluid discharged from a flow path into droplets. After a positive (+) or negative (−) charge is applied to the droplets separated from the fluid, the traveling direction of the droplets is changed by a deflection plate or the like, and the droplets are collected in a predetermined container or the like.

For example, Patent Document 1 discloses that in extraction using a microchip, a droplet is formed by applying vibration to an orifice of the microchip by a vibration element.

CITATION LIST

Patent Document

Patent Document 1: Japanese Patent Application Laid-Open No. 2017-219521

SUMMARY OF THE INVENTION

Problems to be Solved by the Invention

A control technique for stably forming droplets in a flow cytometer is one of important factors for improving the accuracy of sorting. Here, it is known that when formation of a droplet is unstable, such as when a break-off point (BOP) where fluid discharged from a discharge port of a flow path is converted into a droplet is unstable, time during which the droplet is charged with electric charge also becomes unstable, and consequently, sorting of microparticles also becomes unstable.

On the other hand, since the microchip has a large number of high-order eigenvalues and mode shapes corresponding thereto at a frequency (about several 10 kHz to 100 kHz) about an excitation frequency used by the flow cytometer for droplet formation, the microchip may have a plurality of frequencies affected according to the eigenvalues. Therefore, in a case where vibration is applied to the orifice of the microchip, vibration intensity of the microchip complicatedly changes depending on the frequency, which may lead to destabilization of the break-off point.

Accordingly, a main object of the present technology is to provide a technology capable of forming stable droplets.

Solutions to Problems

The present technology first provides a microparticle sorting device including a microchip including a main flow path through which a liquid containing a microparticle flows, a sheath liquid flow path that communicates with the main flow path and through which a sheath liquid flows, and a sheath liquid introduction portion that introduces the sheath liquid, in which the sheath liquid flowing through the sheath liquid introduction portion is vibrated.

The present technology may further include a connecting member attachable to the microchip and having a sheath liquid introduction coupling portion coupled to the sheath liquid introduction portion.

In the present technology, a vibration element may be attached to the connecting member.

In the present technology, a driving frequency of the vibration element may be different from a resonance frequency of a flow path in the microchip.

In the present technology, a driving frequency of the vibration element may be within a range of ±10% from a resonance frequency of a flow path in the microchip.

In the present technology, the sheath liquid introduction coupling portion may include a sheath liquid converging portion having a width that gradually or partially narrows from a side of the vibration element toward a side of the sheath liquid introduction portion.

In the present technology, a height of the sheath liquid converging portion may gradually or partially decrease from a side of the vibration element toward a side of the sheath liquid introduction portion.

The present technology may further include a connecting part having a tubular portion that communicates with a distal end of the sheath liquid converging portion between the sheath liquid converging portion and the sheath liquid introduction portion.

In the present technology, a tubular member may be inserted inside the tubular portion.

In the present technology, at least a part of the tubular portion and/or the tubular member may be formed by at least one selected from the group consisting of an elastomer, a resin, and a metal.

In the present technology, the sheath liquid converging portion may be a substantially conical shape, a substantially polygonal pyramid shape, or a rotating body of an exponential function or a parabola.

In the present technology, the sheath liquid converging portion may be formed by a resin, or a metal, or a transparent member.

In the present technology, an electrode may be inserted into the sheath liquid converging portion.

In the present technology, in the sheath liquid converging portion, a swirling flow that swirls the sheath liquid may be generated.

In the present technology, a sheath liquid introduction port for introducing the sheath liquid into the sheath liquid converging portion may be located at a position away from a center of the sheath liquid converging portion.

Furthermore, the present technology provides a microparticle sorting device including a microchip including a main flow path through which a liquid containing a microparticle flows, a sheath liquid flow path that communicates with the main flow path and supplies a sheath liquid, and a sheath liquid introduction portion that introduces the sheath liquid, a light irradiation unit that irradiates the microparticle with light, a light detection unit that detects light from the microparticle, and a processing unit that processes a signal obtained from the light detection unit, in which the sheath liquid flowing through the sheath liquid introduction portion is vibrated.

Moreover, the present technology also provides a microparticle sorting method including, in a microchip including at least a main flow path through which a liquid containing a microparticle flows, a sheath liquid flow path that communicates with the main flow path and through which a sheath liquid flows, and a sheath liquid introduction portion that introduces the sheath liquid, vibrating the sheath liquid flowing through the sheath liquid introduction portion.

MODE FOR CARRYING OUT THE INVENTION

Figure 1:
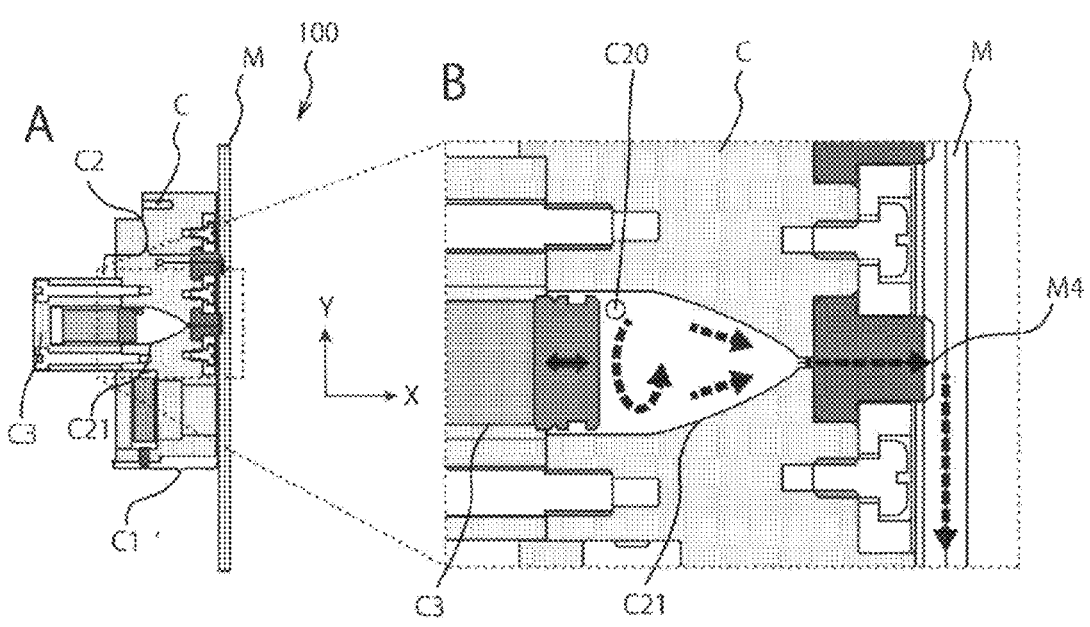
FIG. 1 is a view illustrating a configuration example of a microparticle sorting device according to a first embodiment.

Hereinafter, preferred embodiments for carrying out the present technology will be described with reference to the drawings. Note that the embodiments described below are examples of representative embodiments of the present technology, and the scope of the present technology is not interpreted in a narrow sense by them. Note that the description will be made in the following order.

1. First Embodiment (microparticle sorting device 100)
  (1) Microchip M
  (2) Connecting member C
2. Second embodiment (microparticle sorting device 100)
3. Third embodiment (microparticle sorting device 100)
  [Mode Example 1 of connecting part]
  [Mode Example 2 of connecting part]
  [Mode Example 3 of connecting part]
  [Mode Example 4 of connecting part]
4. Fourth embodiment (microparticle sorting device 100)
  (1) Light irradiation unit 103
  (2) Light detection unit 104
  (3) Processing unit 105
  (4) Sorting unit 106 (including charging unit 106c)
  (5) Storage unit 107
  (6) Display unit 108
  (7) Input unit 109
  (8) Control unit 110
5. Fifth embodiment (microparticle sorting method)

1. First Embodiment (Microparticle Sorting Device 100)

FIG. 1 is a view illustrating a configuration example of a microparticle sorting device 100 according to a first embodiment.

A microparticle sorting device 100 according to the present embodiment includes a microchip M including a main flow path M2 through which a liquid containing a microparticle flows, a sheath liquid flow path M41 that communicates with the main flow path and supplies a sheath liquid, and a sheath liquid introduction portion M4 that introduces the sheath liquid, in which the sheath liquid flowing through the sheath liquid introduction portion M4 is vibrated. Hereinafter, each unit will be described in detail.

(1) Microchip M

Figure 2:
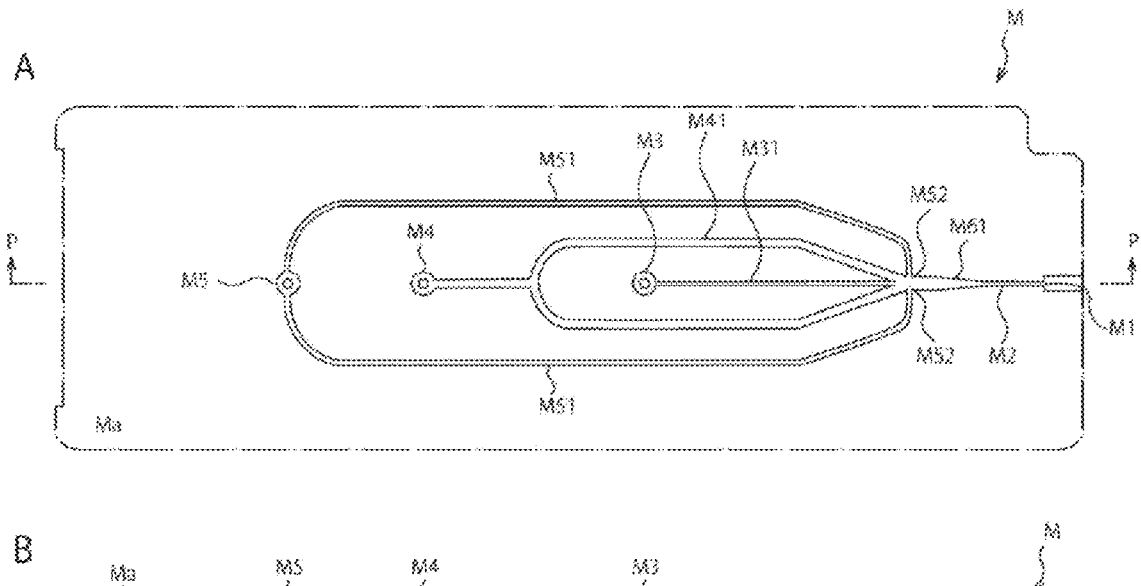
FIG. 2 is a view in which A and B illustrate a configuration example of a microchip.
Figure 2:
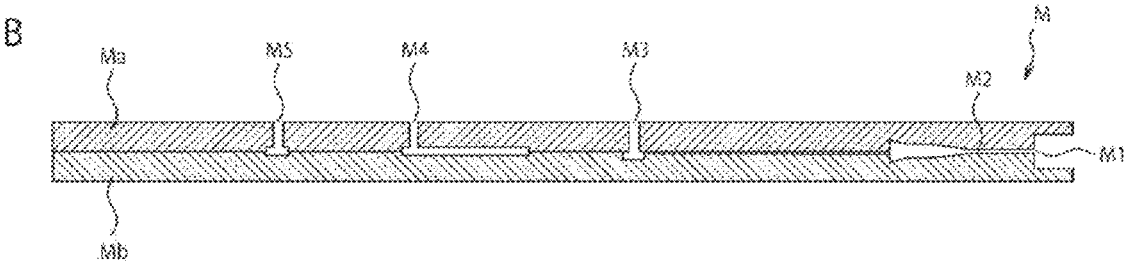
Figure 3:
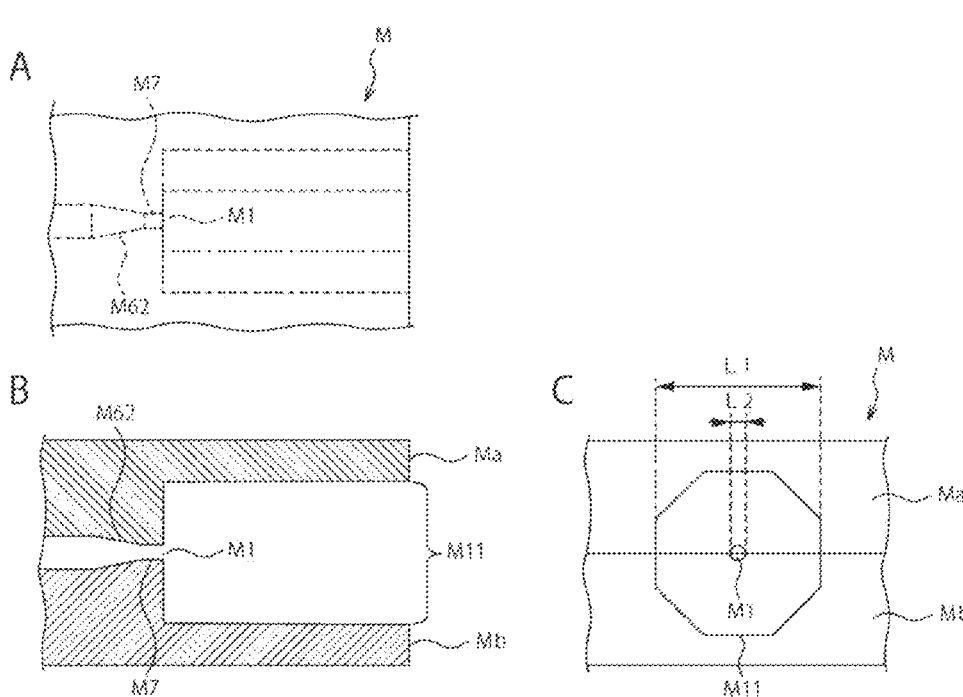
FIG. 3 is a view in which A to C illustrate a configuration example of an orifice of a microchip.

FIG. 2 is a view illustrating a configuration example of the microchip M, and FIG. 3 is a view illustrating a configuration example of an orifice M1 of the microchip M. A of FIG. 2 is a schematic top view, and B of FIG. 2 is a schematic cross-sectional view corresponding to a P-P cross section in A. Furthermore, A of FIG. 3 is a top view, B of FIG. 3 is a cross-sectional view, and C of FIG. 3 is a front view.

As illustrated in A of FIG. 2, the microchip M includes the sheath liquid flow path M41 that communicates with the main flow path M2 and through which a sheath liquid flows, the sheath liquid introduction portion M4 that introduces the sheath liquid, a sample liquid flow path M31 that communicates with the main flow path M2 and through which a sample liquid containing a microparticle flows, a sample liquid introduction portion M3 that introduces the sample liquid, and a merging portion into which the sample flow is introduced and merges with the sheath liquid. The sheath liquid introduced from the sheath liquid introduction portion M4 is separately fed in two directions, and then joins the sample liquid by sandwiching the sample liquid from two directions at the merging portion with the sample liquid introduced from the sample liquid introduction portion M3. Consequently, a three-dimensional laminar flow in which a sample liquid laminar flow is located at the center of a sheath liquid laminar flow is formed at the merging portion.

M51 illustrated in A of FIG. 2 indicates a suction flow path for applying a negative pressure to the inside of the main flow path M2 to temporarily reverse the flow and eliminate clogging or bubbles when clogging or bubbles occur in the main flow path M2. A suction opening M5 connected to a negative pressure source such as a vacuum pump is formed at one end of the suction flow path M51. Furthermore, the other end of the suction flow path M51 is connected to the main flow path M2 at the communication port M52.

A laminar flow width of the three-dimensional laminar flow is narrowed at narrowing portions M61 (see A of FIG. 2) and M62 (see A and B of FIG. 3) formed such that the area of a cross section perpendicular to a liquid feeding direction gradually decreases from the upstream to the downstream in the liquid feeding direction. Thereafter, the three-dimensional laminar flow is discharged as a fluid stream from the orifice M1 provided at one end of the flow path.

Here, in the prior art, the fluid stream ejected from the orifice M1 is converted into fluid droplets by the vibrating element applying vibration to the orifice M1, but in the present technology, the fluid stream ejected from the orifice M1 is converted into fluid droplets by applying vibration to the sheath liquid flowing through the sheath liquid introduction portion M4 as described later.

The orifice M1 is opened in an end face direction of substrate layers Ma and Mb, and a cutout portion M11 is provided between an opening position thereof and end faces of the substrate layers. The cutout portion M11 is formed by cutting out the substrate layers Ma and Mb between the opening position of the orifice M1 and the substrate end surfaces such that a diameter L1 of the cutout portion M11 is larger than an opening diameter L2 of the orifice M1 (see C of FIG. 3). The diameter L1 of the cutout portion M11 is preferably formed to be twice or more larger than the opening diameter L2 of the orifice M1 so as not to hinder the movement of the droplets discharged from the orifice M1.

In the present technology, "micro" means that at least a part of the flow path included in the microchip M has a dimension on the order of μm, particularly, a cross-sectional dimension on the order of μm. That is, in the present technology, the "microchip" refers to a chip including a flow path on the order of μm, particularly a chip including a flow path having a cross-sectional dimension on the order of μm. For example, a chip including a particle sorting unit configured by a flow path having a cross-sectional dimension on the order of μm may be referred to as a microchip according to the present technology.

The microchip M can be manufactured by a method known in the art. For example, the microchip M is formed by bonding the substrate layers Ma and Mb in which the main flow path M2 is formed. The main flow path M2 can be formed in the substrate layers Ma and Mb by, for example, injection molding of a thermoplastic resin using a mold. For example, the flow path may be formed in all of two or more substrates, or may be formed only in some of the two or more substrates. Furthermore, the microchip M may be formed by three or more substrates by further bonding the substrates from an upper direction, a lower direction, or both directions with respect to the plane of the substrate in which each flow path is formed.

As a material for forming the microchip M, a material known in the art can be used. Examples thereof include, but are not limited to, polycarbonate (PC), cycloolefin polymer, polypropylene, polydimethylsiloxane (PDMS), polymethyl methacrylate (PMMA), polyethylene, polystyrene, glass, silicon, and the like. Among them, for example, polymer materials such as polycarbonate, cycloolefin polymer, and polypropylene are particularly preferable because they are excellent in processability and a microchip can be manufactured inexpensively using a molding apparatus.

The microchip M is preferably transparent. For example, in the microchip M, at least a portion through which light (laser light and scattered light) passes may be transparent, and the entire microchip M may be transparent.

In the present technology, the "sample" contained in the sample liquid is particularly microparticles, and the microparticles may be particles having a dimension capable of flowing in a flow path in the microchip M. In the present technology, the microparticles may be appropriately selected by those skilled in the art. In the present technology, the microparticles may include, for example, biological microparticles such as cells, cell aggregations, microorganisms, and ribosomes, and synthetic microparticles such as gel particles, beads, latex particles, polymer particles, and industrial particles.

The biological microparticles (also referred to as "bioparticles") may include chromosomes, ribosomes, mitochondria, organelles (small cellular organs), and the like constituting various cells. The cells may include animal cells (for example, blood cells, or the like), plant cells. The cells may in particular be blood-derived cells or tissue-derived cells. The blood cells may be, for example, suspension cells such as T cells and B cells. The tissue-derived cells may be, for example, adherent cells separated from adherent cultured cells or tissues, or the like. The cell aggregations may include, for example, spheroids, organoids, and the like. The microorganisms may include bacteria such as *Escherichia coli*, viruses such as tobacco mosaic virus, fungi such as yeast, and the like. Moreover, the biological microparticles may also include biological polymers such as nucleic acids, proteins, and complexes thereof. These biological polymers may be, for example, those extracted from cells, or those contained in blood samples or other liquid samples.

The synthetic microparticles may be, for example, microparticles including an organic or inorganic polymer material, metal, or the like. The organic polymer material may include polystyrene, styrene-divinylbenzene, polymethyl methacrylate, and the like. The inorganic polymer material may include glass, silica, a magnetic material, and the like. The metal may include gold colloid, aluminum, and the like. The synthetic microparticles may be, for example, gel particles, beads, or the like, and may particularly be gel particles or beads to which one or a combination of two or more selected from oligonucleotides, peptides, proteins, or enzymes are bound.

The shapes of the microparticles may be spherical or substantially spherical, or may be non-spherical. The size and mass of the microparticles can be appropriately selected by those skilled in the art depending on the size of the flow path of the microchip M. On the other hand, the size of the flow path of the microchip M can also be appropriately selected according to the size and mass of the microparticles. In the present technology, a chemical or biological label, for example, a fluorescent dye, a fluorescent protein, or the like can be attached to the microparticles as necessary. The label can make detection of the microparticles easier. The label to be attached can be appropriately selected by those skilled in the art. A molecule (for example, antibody, aptamer, DNA, RNA, or the like) that specifically reacts with the microparticles may bind to the label.

In the present technology, the microparticles are preferably biological particles, and can be particularly cells.

(2) Connecting Member C

The microparticle sorting device 100 according to the present embodiment further includes a connecting member attachable to the microchip M and having a sheath liquid introduction coupling portion C2 coupled to the sheath liquid introduction portion M4.

A connecting member C illustrated in FIG. 1 includes at least a sample liquid introduction coupling portion C1 coupled to the sample liquid introduction portion M3 and a sheath liquid introduction coupling portion C2 coupled to the sheath liquid introduction portion M4.

By using the connecting member C detachable from the microchip M, when many different microparticles are continuously sorted using one device, a part of components constituting the device can be detached. Thus, even if the microparticles contained in the previously sorted fluid flow remain in a component, the entire component can be removed, and the risk of contamination can be reduced. Furthermore, by making the microchip M and the connecting member C disposable for each sample, it is possible to save the trouble of the cleaning operation performed when changing the sample and to reduce the burden on the operator.

The sheath liquid introduction coupling portion C2 may include a liquid feeding tube capable of feeding liquid from the sheath liquid feeding unit 101. Moreover, the liquid feeding tube may have an inter-tube coupling portion directly coupled to the sheath liquid feeding unit 101. In this case, the inter-tube coupling portion is preferably configured so that the liquid in the liquid feeding tube does not come into contact with the outside air. Thus, cleanliness of the sheath liquid can be secured.

The sample liquid introduction coupling portion C1 may have a tube fixing portion for fixing a liquid feeding tube capable of feeding liquid from a sample liquid feeding unit 102. Thus, it is possible to save labor such as attachment and fixing of each tube, prevent complication of operation at the time of measurement, and reduce a burden on an operator. Furthermore, by making these members disposable for each sample, contamination can also be prevented.

The liquid feeding tube can be formed integrally with the connecting member C, or can be formed separately. For example, the liquid feeding tube and the tube fixing portion capable of feeding liquid from the sample liquid feeding unit 102 are formed to be detachable from the connecting member C, and can facilitate connection to the sample liquid feeding unit 102 arranged at a place different from the sheath liquid feeding unit 101.

In the present embodiment, a vibration element C3 is attached to the connecting member C. Thus, it is possible to propagate vibration to the sheath liquid flowing through the sheath liquid introduction portion M4 of the microchip M and induce formation of droplets after being ejected from the nozzle.

The driving frequency of the vibration element C3 is preferably different from the resonance frequency of the flow path in the microchip M. Hereinafter, the reason will be described in detail.

Figure 4:
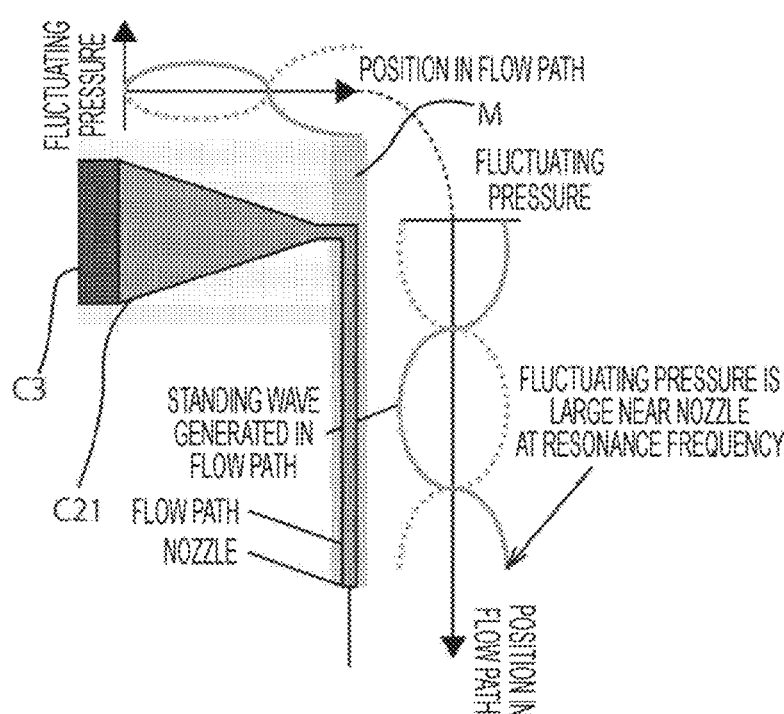
FIG. 4 is a view illustrating an image of a stationary wave generated in a flow path.
Figure 5:
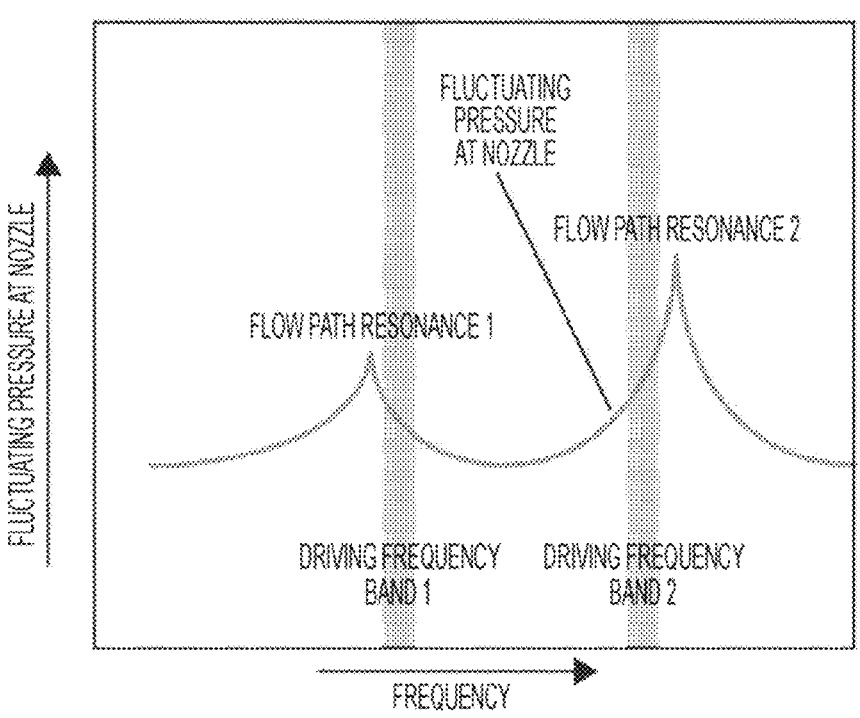
FIG. 5 is a diagram illustrating a relationship between a fluctuating pressure and a driving frequency in a nozzle.

As illustrated in FIG. 4, a standing wave is generated between the vibration element C3 and the nozzle, but a fluctuating pressure near the nozzle changes depending on a shape, a size, a material, a driving frequency, and the like of the flow path. A state in which the fluctuating pressure is maximized is what is called resonance (see FIG. 5), and for example, the resonance frequency can be lowered by increasing the length of the flow path, and the resonance frequency can be adjusted by combining a plurality of such properties. Then, detailed frequency characteristics of the fluctuating pressure can be estimated by using a commercially available acoustic analysis software or the like. If resonance occurs at a driving frequency desired to be used, droplets can be formed with small vibration energy, but the manner of change in the fluctuating pressure is reversed before and after the resonance frequency of the flow path in the microchip M, and the fluctuation is also steep. Thus, droplet formation at the resonance frequency is inferior in terms of stability. Therefore, as illustrated in FIG. 5, by slightly shifting the driving frequency from the resonance frequency, it is possible to achieve both improvement in efficiency by resonance and stability.

In the present technology, it does not matter whether the driving frequency is shifted to a higher side or a lower side or the resonance frequency. Normally, the driving frequency is set as a frequency band having a certain width for adjustment. The shift amount is not particularly limited as long as the driving frequency band does not cross the resonance frequency even if there is a disturbance such as a temperature change, and is only required to be set in consideration of a balance between an efficiency improvement effect to be obtained and stability in the frequency band. In the present technology, the driving frequency of the vibration element can be within a range of ±10% from the resonance frequency of the flow path in the microchip M, for example.

In the present embodiment, the sheath liquid introduction coupling portion C2 preferably includes a sheath liquid converging portion C21 having a width that gradually or partially narrows from a side where the vibration element C3 is attached toward a side of the sheath liquid introduction portion M4. Thus, a thickness of the flow path in the sheath liquid introduction coupling portion C2 is gradually narrowed from a thickness of about the vibration element C3 to a thickness of about the sheath liquid introduction portion M4, the scale of the size of about the vibration element C3 and the scale of the size of about the flow path are connected, vibration energy of the vibration element C3 is concentrated near the sheath liquid introduction portion M4, and vibration energy can be efficiently sent into the flow path in the microchip M with a small drive voltage. Hereinafter, how the vibration is propagated to the sheath liquid near the sheath liquid introduction portion M4 of the microchip M will be described in detail.

Figure 6:
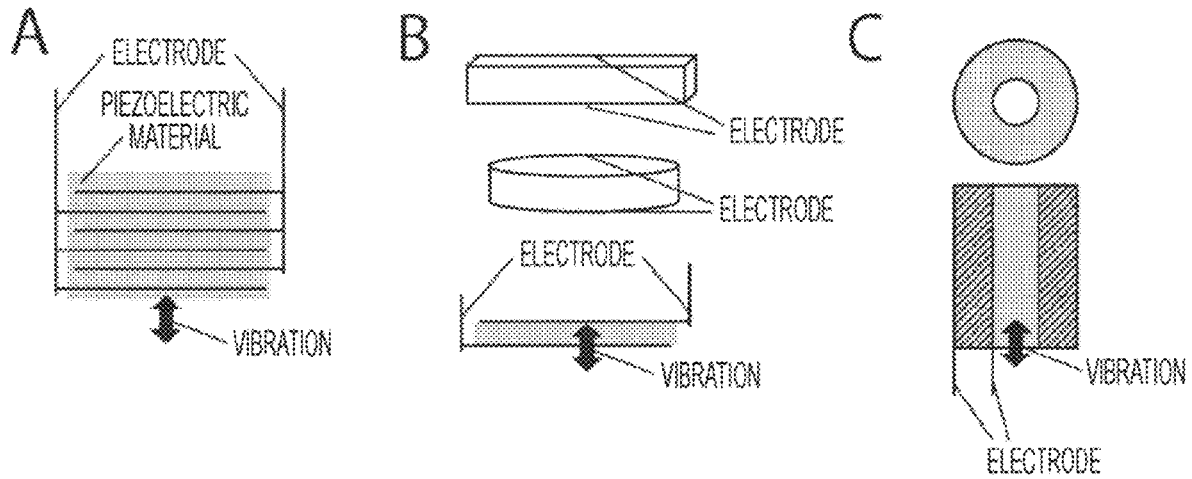
FIG. 6 is a view illustrating applicable structure examples of a piezoelectric element unit.
Figure 7:
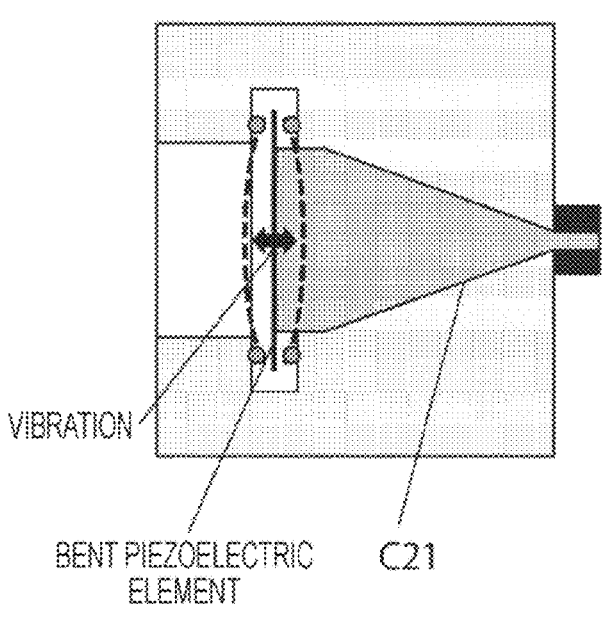
FIG. 7 is a view illustrating a configuration example in a case where a bent piezoelectric element is used.

The sheath liquid is supplied from the sheath liquid feeding unit 101 to the sheath liquid converging portion C21, and the sheath liquid is vibrated by the vibration element C3 arranged upstream of the converging portion C21. The vibration element C3 includes, for example, a piezoelectric element unit and a piston portion, and each of the piezoelectric element portion and the piston portion is firmly coupled with an adhesive or the like. The structure of the piezoelectric element unit is not limited as long as vibration to be finally extracted can be vibrated in the X direction (see B of FIG. 1) with a necessary amplitude at a target vibration frequency. For example, a stacked structure, a square plate structure, a disk structure, a tube structure, or the like is conceivable (see A to C of FIG. 6). Furthermore, as the vibration element C3, a magnetic force such as a permanent magnet and a solenoid may be used. Moreover, instead of such a structure in which the piston bonded to the piezoelectric element is inserted into the converging portion C21, a structure in which a bent piezoelectric element is attached to a top surface of the converging portion C21 as illustrated in FIG. 7 may be adopted. The sheath liquid is fed into the chip from the sheath liquid introduction portion M4 of the microchip M, and the vibration of the vibration element C3 propagates through the sheath liquid to induce droplet formation after ejection from the nozzle.

As the vibration element C3, for example, a piezoelectric element such as a piezoelectric element can be used, but as described above, the vibration element C3 that converts electric energy into vibration through a magnetic force such as a permanent magnet and a solenoid can be used. Furthermore, the frequency is not limited to the ultrasonic region of 20 kHz or more, and can be appropriately set according to the size of the droplet to be formed.

It is preferable that the shape of the sheath liquid converging portion C21 gradually or partially decrease in height from the vibration element C3 side toward the sheath liquid introduction portion M4 side. Specifically, for example, the shape can be a substantially conical shape, a substantially polygonal pyramid shape, or a rotating body of an exponential function or a parabola. By designing these shapes, vibration energy can be efficiently concentrated. As long as the vibration element C3 can sufficiently generate vibration energy and there is no problem in assemblability, the present invention is not limited to these shapes, but in general, a form in which the flow path is gradually narrowed has a larger advantage (for example, since the amplitude of the vibration element C3 may be small, droplets can be formed with a low drive voltage of the piezoelectric element, and the degree of freedom in selection and design of the piezoelectric element increases).

In a case where a substantially polygonal pyramid shape is selected as the shape of the sheath liquid converging portion C21, a flat portion can be provided. Thus, in particular, when the sheath liquid converging portion C21 is formed by a transparent member, there is an advantage that the inside of the converging portion C21 can be easily viewed and bubbles and the like can be easily confirmed. Note that a substantially polygonal pyramid having a small inner angle, such as a substantially triangular pyramid, is not desirable because air bubbles are easily caught in each corner and it is difficult to remove air bubbles, and for example, a substantially polygonal pyramid having a large inner angle, such as a substantially hexagonal or more polygonal pyramid, is desirable. In addition, in order to enhance the effect without inhibiting the swirling flow described later, a polygonal pyramid having a large internal angle is desirable. Moreover, it is desirable not to sharpen each corner and to appropriately apply R from the viewpoint of removing bubbles or because swirling flow is not hindered. The appropriate application of R includes, for example, applying R of about $\frac{1}{10}$ or more of the inscribed circle radius of the polygon.

Note that the detailed shape and dimension of the sheath liquid converging portion C21 are preferably determined while checking the acoustic characteristics thereof. Thus, the use efficiency of the vibration energy can be further enhanced.

As the material forming the sheath liquid converging portion C21, a material known in the art can be used, but in the present technology, it is preferable to form the sheath liquid converging portion C21 with a resin, a metal, or a transparent member. As the resin, for example, polyether ether ketone (PEEK) or the like can be used. Furthermore, as the transparent member, for example, polymethyl methacrylate (PMMA), polycarbonate (PC), or the like can be used. By forming the sheath liquid converging portion C21 with the transparent member, the inside of the sheath liquid converging portion C21 can be observed. As the metal, for example, stainless steel, an aluminum alloy, a titanium alloy, or the like can be used. By forming the sheath liquid converging portion C21 with metal, it is possible to omit an electrode for droplet charging.

Figure 8:
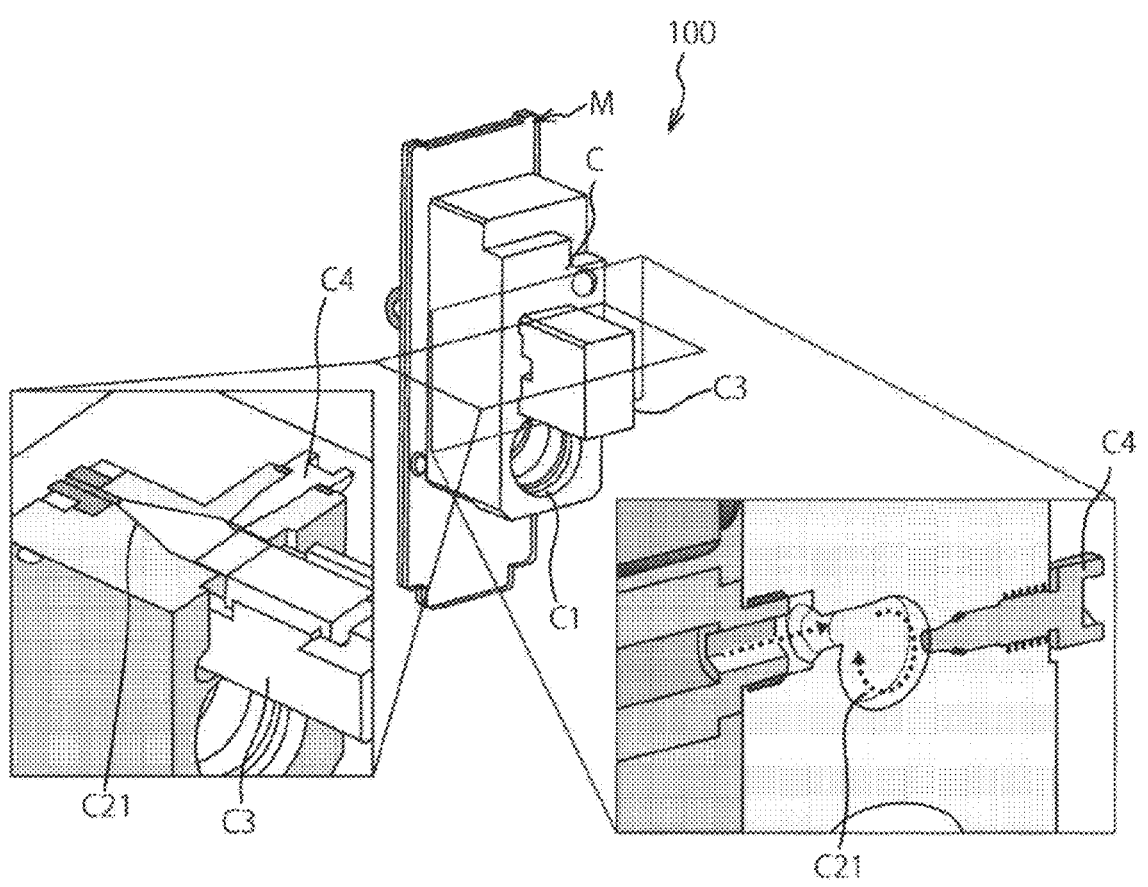
FIG. 8 is a view illustrating an electrode disposed near the sheath liquid converging portion.

FIG. 8 is a view illustrating an electrode C4 disposed near the sheath liquid converging portion C21. In a case where the sheath liquid converging portion C21 is formed by an insulator such as a resin when a charge is applied to formed droplets, as illustrated in FIG. 8, the electrode C4 is inserted into the sheath liquid converging portion C21, so that the droplets can be charged through the sheath liquid. The purpose of this is to bring the distance between the droplet dividing point and the electrode C4 as close as possible, and to perform charging at a timing closer to an ideal.

In a case of this configuration, fine bubbles may be caught at the boundary or the like between the hole of the sheath liquid converging portion C21 and the electrode C4, and when the flow is stagnant, it is particularly difficult to remove the bubbles. Accordingly, in the present technology, it is preferable to generate a swirling flow that swirls the sheath liquid in the sheath liquid converging portion C21. Thus, the stagnation portion is eliminated by the generated swirling flow, and the air bubbles can be easily removed.

Furthermore, the sheath liquid converging portion C21 hits a portion where the flow path becomes thick in the entire flow path system, and air bubbles are likely to remain inside the portion. When the bubbles are retained, vibration energy is absorbed by the bubbles, and the break-off point is affected. Accordingly, it is conceivable that a sheath liquid introduction port C20 for introducing the sheath liquid into the sheath liquid converging portion C21 is located at a position away from the center of the sheath liquid converging portion C21. Specifically, for example, the position of the sheath liquid introduction port C20 is offset from the center of the sheath liquid converging portion C21 to the upper portion, and is further arranged at the upstream portion. Thus, a swirling flow is generated in the sheath liquid converging portion C21 so as not to generate the stagnation portion to thereby prevent air bubbles from remaining, and the air bubbles easily gather at the center of the flow path and flow down because their specific gravity is smaller than that of the sheath liquid.

Note that the offset may be not in the upper direction but in the lower direction of the sheath liquid converging portion C21 as long as the strength of the generated swirling flow is sufficient to cause the air bubbles to flow down. Furthermore, there is also a configuration in which the electrode C4 is inserted into this portion in order to charge droplets (see FIG. 8), where fine bubbles may be caught at the boundary between the hole formed in the sheath liquid converging portion C21 and the electrode C4, and the like, and thus an effect of peeling and removing the bubbles adhering to the periphery of the electrode C4 by the swirling flow can also be expected.

In the present embodiment, the microchip M and the connecting member C can be appropriately detached as necessary, and may be disposable (disposable). Furthermore, the vibration element C3 attached to the connecting member C may also be circulated while being attached to the connecting member C in advance, and in this case, the vibration element C3 may be disposable.

2. Second Embodiment (Microparticle Sorting Device 100)

Figure 9:
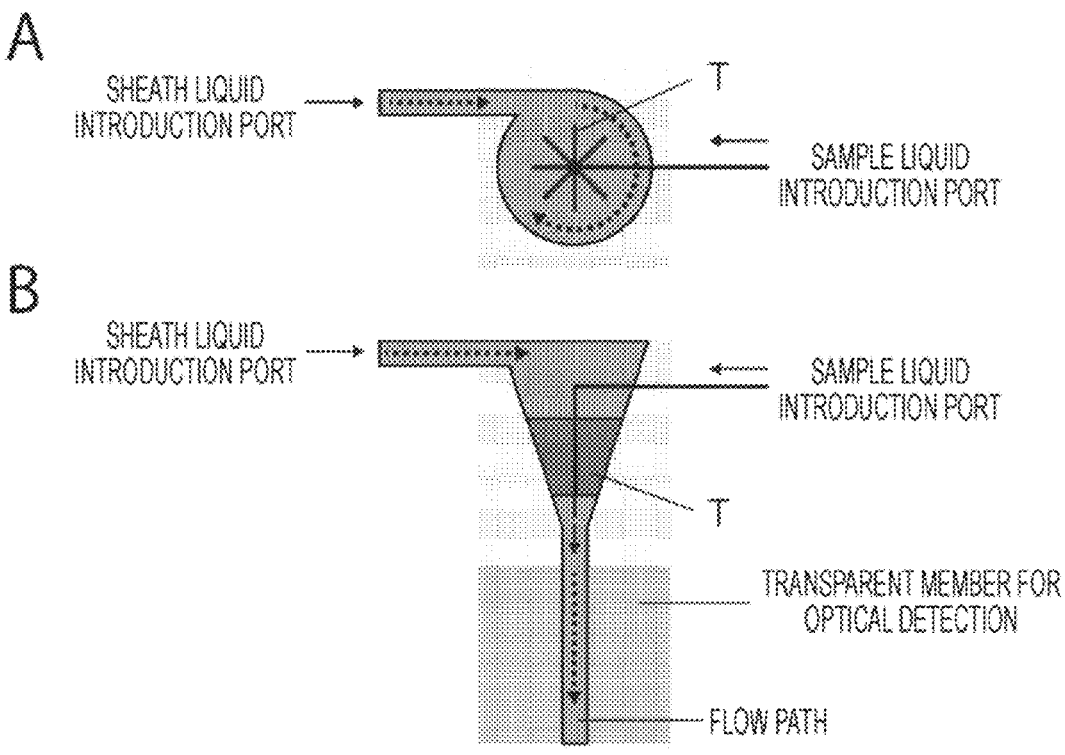
FIG. 9 is a view in which A and B illustrate a configuration example of a microparticle sorting device according to a second embodiment.

A and B of FIG. 9 are views illustrating a configuration example of a microparticle sorting device according to a second embodiment. A of FIG. 9 is a schematic top view, and B of FIG. 9 is a schematic cross-sectional view.

In the first embodiment described above, the merging portion where the sample flow is introduced and merges with the sheath liquid is formed in the microchip M, and the sample liquid is introduced into the sheath liquid in the microchip M. However, the present embodiment is configured such that a flow path in a form of introducing the sample liquid into the sheath liquid converging portion C21 and converging a core stream containing the sample liquid by hydrodynamic focusing. Note that the present embodiment is similar to the first embodiment described above except that the method of introducing the sample liquid into the sheath liquid is different.

In the present embodiment, as illustrated in FIG. 9, a swirling component of the flow is removed by a current plate formed inside the sheath liquid converging portion C21 upstream of the position of the sample liquid introduction port for introducing the sample liquid into the sheath liquid converging portion C21, and then the sample liquid is introduced. This makes it possible to prevent the core stream from being disturbed by the swirling flow. The current plate can be formed by, for example, a thin plate or the like. Here, it is preferable that the current plate is not disposed in the thickest portion of the flow path so as not to disturb the swirling flow.

3. Third Embodiment (Microparticle Sorting Device 100)

FIGS. 12 and 14 to 16 are views illustrating mode examples of a connecting part C22 in the microparticle sorting device 100 according to a third embodiment. Note that, in FIGS. 14 to 16, the vibration element C3 is omitted.

In the present embodiment, the sheath liquid introduction coupling portion C2 has the sheath liquid converging portion C21 in which a width and a height gradually or partially decrease from the side where the vibration element C3 is attached toward the sheath liquid introduction portion M4 side, and includes a connecting part C22 having a tubular portion C221 communicating with a distal end C211 of the sheath liquid converging portion C21 between the sheath liquid converging portion C21 and the sheath liquid introduction portion M4. Note that the present embodiment is similar to the first embodiment described above except that the connecting part C22 is provided.

In the present embodiment, by providing the connecting part C22, it is possible to more efficiently connect the scale of the size of about the vibration element C3 and the scale of the size of about the flow path.

Examples of the material forming the connecting part C22 include an elastomer, a resin, a metal, or a combination of two or more thereof, and the like.

Examples of the elastomer include thermosetting elastomers and thermoplastic elastomers, and the like.

Examples of the thermosetting elastomer include vulcanized rubber such as natural rubber and synthetic rubber, resin-based elastomer such as silicone rubber and fluororubber, and the like.

Examples of the thermoplastic elastomer include polystyrene-based thermoplastic elastomers, olefinic/alkene-based thermoplastic elastomers, polyvinyl chloride-based thermoplastic elastomers, polyurethane-based thermoplastic elastomers, polyester-based thermoplastic elastomers, polyamide-based thermoplastic elastomers, and the like.

Examples of the resin include a thermoplastic resin, a thermosetting resin, and the like.

Examples of the thermoplastic resin include: polyolefins such as polystyrene, polyethylene, and polypropylene; polyvinyl chloride; acrylic resin; ABS resin; AS resin; engineering plastics such as polyamide, polycarbonate, polyacetal, and polyethylene terephthalate; super engineering plastics such as polyether sulfone, polyether ether ketone (PEEK), and thermoplastic polyimide; and the like.

Examples of the thermosetting resin include a phenol resin, a melamine resin, polyurethane, an unsaturated polyester resin, an epoxy resin, and the like.

Examples of the metal include an aluminum alloy, a titanium alloy, stainless steel, and the like.

Hereinafter, specific mode examples of the connecting part C22 will be described in detail.

Mode Example 1 of Connecting Part C22

Figure 12:
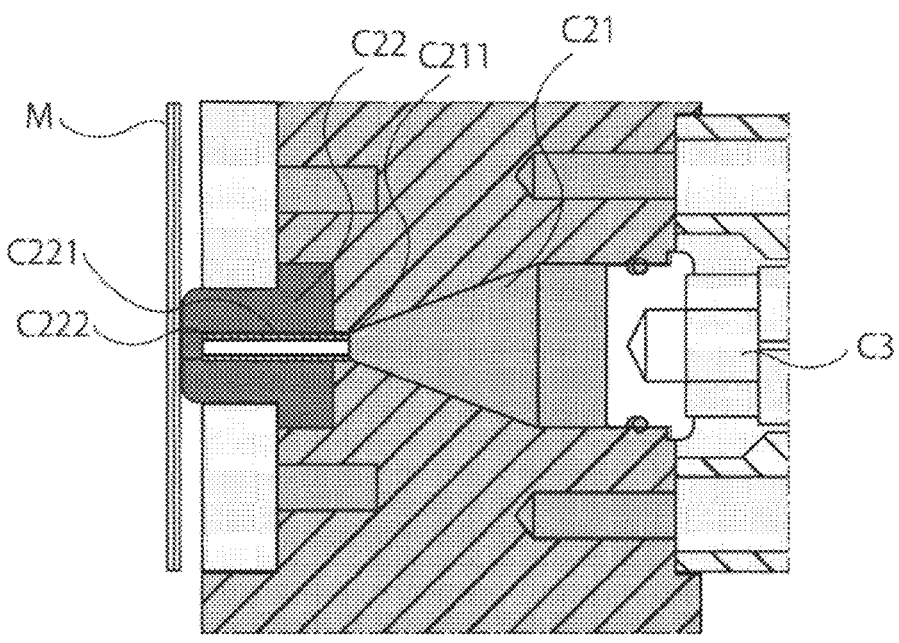
FIG. 12 is a view schematically illustrating Mode Example 1 of the connecting part.

FIG. 12 is a view schematically illustrating Mode Example 1 of the connecting part C22. In Mode Example 1, a tubular member C222 is inserted inside the tubular portion C221 formed by a thermosetting elastomer. Thus, when coming into contact with the sheath liquid, it can be separated from the acoustic impedance of the sheath liquid (when the acoustic impedance is comparable, vibration is diffused and vibration energy is dissipated). Consequently, the vibration generated from the vibration element C3 can be prevented from diffusing to the connecting part C22, and the vibration energy can be efficiently transmitted to the flow path in the microchip M.

Figure 13:
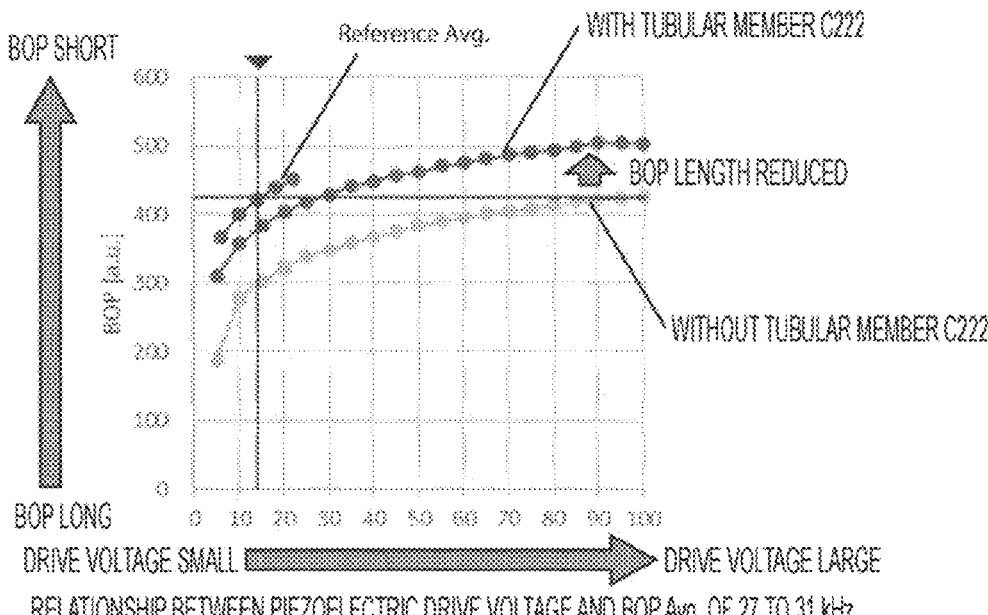
FIG. 13 is a graph illustrating a relationship between a drive voltage and a BOP length of 27 to 31 kHz.

Furthermore, in a case where the drive voltage applied to the vibration element C3 is the same as that in a case where the tubular member C222 is not inserted, as illustrated in FIG. 13, a shorter BOP length can be obtained, or the same BOP length can be obtained at a lower drive voltage.

Examples of the material forming the tubular member C222 include the above-described elastomer, a resin, a metal, or a combination of two or more thereof, and the like. In Mode Example 1, among these, polystyrene, an acrylic resin, an aluminum alloy, a titanium alloy, or stainless steel is particularly preferable, an aluminum alloy, a titanium alloy, or stainless steel is more preferable, and stainless steel is still more preferable.

Furthermore, in Mode Example 1, it is preferable that at least a part of the tubular member C222 is formed by the above-described material, but it is more preferable that the entire tubular member C222 is formed by of the above-described material. Moreover, in the present Mode Example 1, the tubular portion C221 may be formed by a thermosetting elastomer to function as sealing.

In the present embodiment, the length in a longitudinal direction of the tubular portion C221 may be the same as the length in a longitudinal direction of the tubular member C222, but may be slightly short in consideration of crushing for sealing. In addition, the size of the inner and outer diameters and the like of the tubular member C222 is not particularly limited, but the outer diameter of the tubular member C222 can be, for example, the same as or slightly larger than the flow path diameter of the tubular portion C221.

Mode Example 2 of Connecting Part C22

Figure 14:
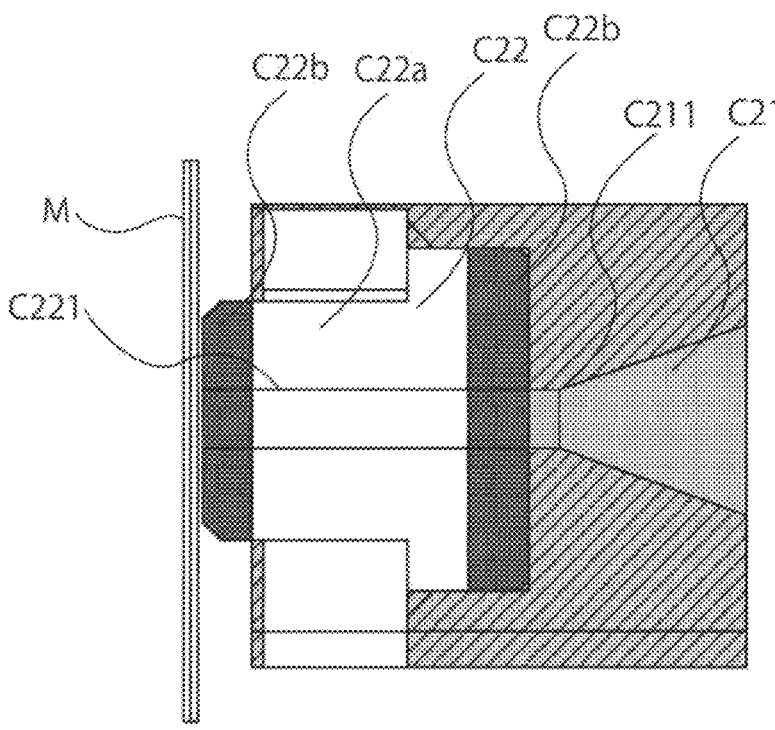
FIG. 14 is a view schematically illustrating Mode Example 2 of the connecting part.

FIG. 14 is a view schematically illustrating Mode Example 2 of the connecting part C22. In Mode Example 2, the connecting part C22 including the tubular portion 221 is formed by two-color molding of a resin C22a and a thermosetting elastomer C22b. Specifically, the thermosetting elastomer C22b for sealing is fused to the resin C22a by two-color molding. By forming at least a part of the tubular portion C221 in the connecting part C22 with the resin C22a in this manner, it can be separated from the acoustic impedance of the sheath liquid when coming into contact with the sheath liquid as compared with a case where the entire tubular portion 221 is formed by the thermosetting elastomer, and it is possible to suppress diffusion of vibration to the outside of the flow path of the tubular portion C221. Here, examples of the resin C22a include those described above, and in the present Mode Example 2, among them, polystyrene or an acrylic resin is particularly preferable.

Mode Example 3 of Connecting Part C22

Figure 15:
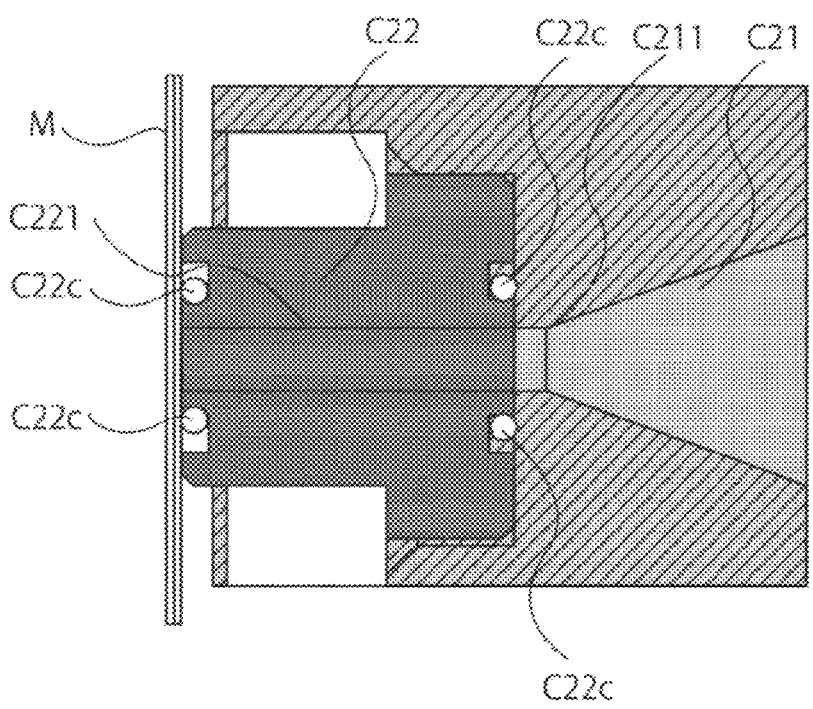
FIG. 15 is a view schematically illustrating Mode Example 3 of the connecting part.

FIG. 15 is a view schematically illustrating Mode Example 3 of the connecting part C22. In Mode Example 3, the entire connecting part C22 including the tubular portion 221 is formed by metal, and then O-rings C22c for sealing are disposed at both ends of the connecting part C22. By forming the entire connecting part 22 with metal in this manner, the vibration generated from the vibration element C3 can be prevented from diffusing to the connecting part C22, and the vibration energy can be efficiently transmitted to the flow path in the microchip M. Here, examples of the metal include those described above, and in the present Mode Example 3, particularly, an aluminum alloy, a titanium alloy, or stainless steel is preferable, and stainless steel is more preferable. Furthermore, as the material forming the O-ring C22c, a material known in the art can be used. Examples thereof include the above-described elastomers, resins, or combination of two or more thereof, and the like.

Mode Example 4 of Connecting Part C22

Figure 16:
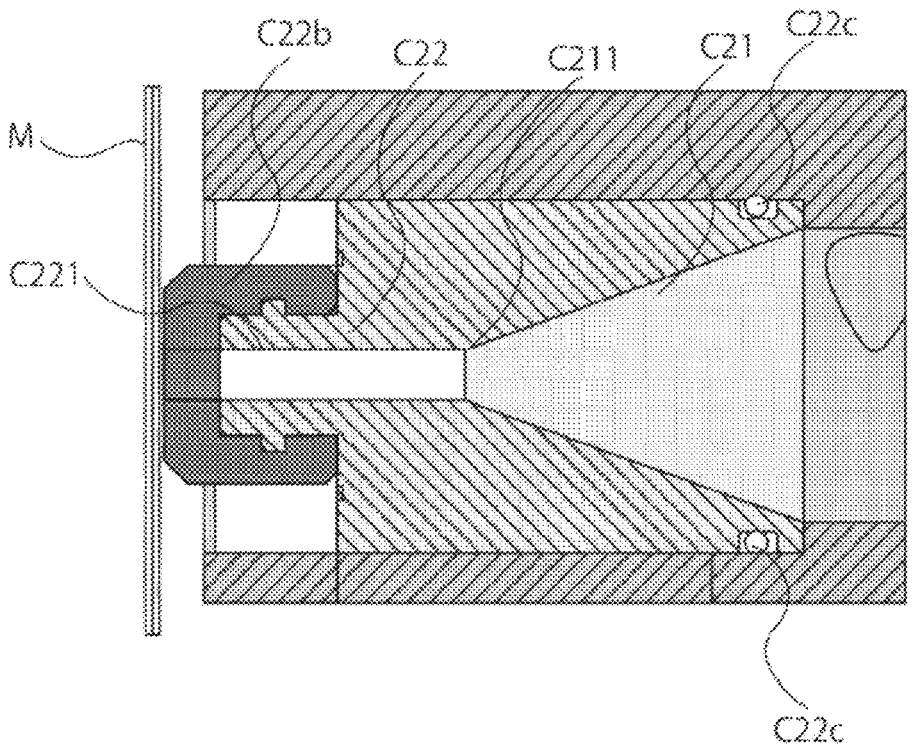
FIG. 16 is a view schematically illustrating Mode Example 4 of the connecting part.

FIG. 16 is a view schematically illustrating Mode Example 4 of the connecting part C22. In Mode Example 4, the sheath liquid converging portion C21 and a part of the connecting part C22 including the tubular portion 221 are formed by metal, and the O-ring C22c and the thermosetting elastomer C22b are disposed for sealing at both ends thereof. By forming the sheath liquid converging portion C21 with metal in this manner, it is possible to further suppress diffusion of the vibration generated from the vibration element C3. Here, examples of the metal forming the sheath liquid converging portion C21 and a part of the connecting part C22 include those described above, but in the Mode Example 4, particularly, an aluminum alloy, a titanium alloy, or stainless steel is preferable, and stainless steel is more preferable. In addition, examples of the material forming the O-ring C22c include those described above.

4. Fourth Embodiment (Microparticle Sorting Device 100)

Figure 10:
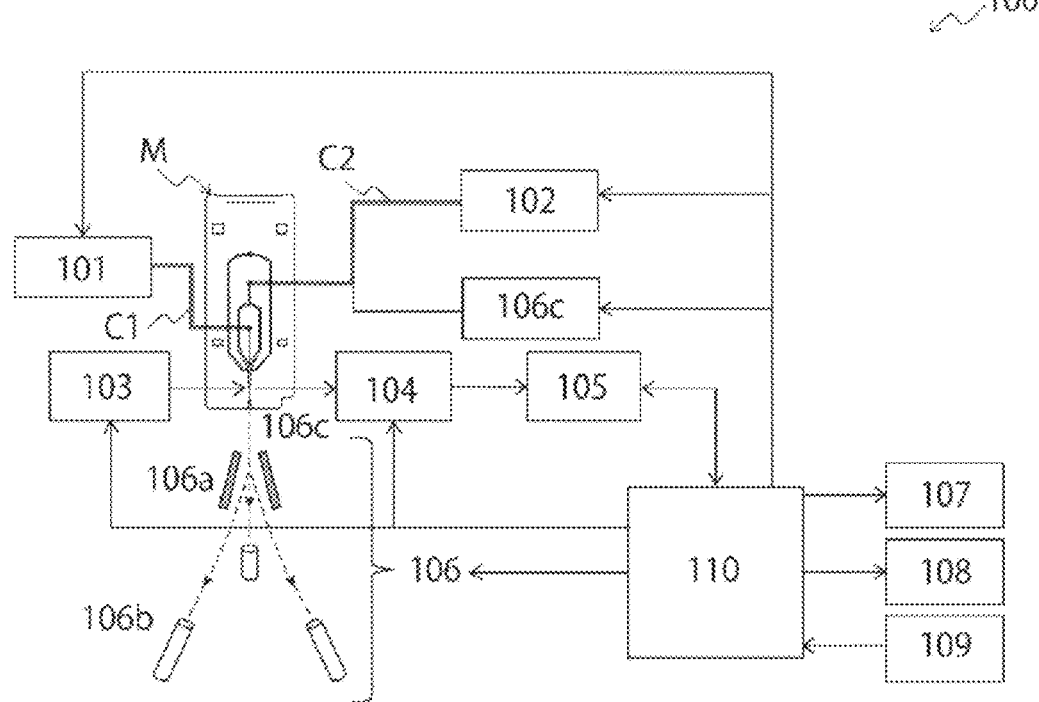
FIG. 10 is a diagram illustrating a configuration example of a microparticle sorting device according to a third embodiment.

FIG. 10 is a diagram illustrating a configuration example of a microparticle sorting device according to a fourth embodiment.

A microparticle sorting device 100 according to the present embodiment includes a microchip including a main flow path M2 through which a liquid containing a microparticle flows, a sheath liquid flow path M41 that communicates with the main flow path M2 and supplies a sheath liquid, and a sheath liquid introduction portion M4 that introduces the sheath liquid, a light irradiation unit 103 that irradiates the microparticle with light, a light detection unit 104 that detects light from the microparticle, and a processing unit 105 that processes a signal obtained from the light detection unit 104, in which the sheath liquid flowing through the sheath liquid introduction portion is vibrated. Furthermore, a sorting unit 106, a storage unit 107, a display unit 108, an input unit 109, a control unit 110, and the like may be provided as necessary.

Since the microchip M is similar to that described above, the description thereof is omitted here. In addition, the method of vibrating the sheath liquid flowing through the sheath liquid introduction portion M4 of the microchip M is also similar to that described above, and thus the description thereof is omitted here.

(1) Light Irradiation Unit 103

The light irradiation unit 103 irradiates a microparticle to be sorted with light (for example, excitation light or the like). The light irradiation unit 103 may include a light source that emits light and an objective lens that condenses excitation light on the microparticle flowing in the detection region. The light source may be appropriately selected by a person skilled in the art according to the purpose of sorting, and may be, for example, a laser diode, an SHG laser, a solid-state laser, a gas laser, or a high-luminance LED, or may be a combination of two or more thereof. The light irradiation unit 103 may include other optical elements as necessary in addition to the light source and the objective lens.

(2) Light Detection Unit 104

The light detection unit 104 detects light (scattered light and/or fluorescence) generated from the microparticle by irradiation by the light irradiation unit 103. The light detection unit 104 may include a condenser lens that collects fluorescence and/or scattered light generated from the microparticle, and a light detector. As the light detector, a PMT, a photodiode, a CCD, a CMOS, or the like can be used, but the present technology is not limited thereto. The light detection unit 104 may include other optical elements as necessary in addition to the condenser lens and the light detector. The light detection unit 104 may further include, for example, a spectroscopic unit. Examples of an optical component constituting the spectroscopic unit can include a grating, a prism, and an optical filter, and the like. The spectroscopic unit can detect, for example, light having a wavelength to be detected separately from light having another wavelength.

The fluorescence detected by the light detection unit 104 may be fluorescence generated from the microparticle itself and fluorescence generated from a substance labeled in the microparticle, for example, a fluorescent substance or the like, but is not limited thereto in the present technology. The scattered light detected by the light detection unit 104 may be forward scattered light, side scattered light, Rayleigh scattering, Mie scattering, or a combination thereof.

(3) Processing Unit 105

The processing unit 105 is connected to the light detection unit 104 and processes a signal obtained from the light detection unit 104. For example, a detection value of light received from the light detection unit 104 can be corrected to calculate characteristic amounts of each microparticle. More specifically, the characteristic amounts indicating a size, a form, an internal structure, and the like of the microparticle are calculated from detection values of received fluorescence, forward scattered light, and backward scattered light. In addition, a sorting control signal can also be generated by performing sorting determination on the basis of the calculated characteristic amounts, a sorting condition received in advance from the input unit, and the like.

The processing unit 105 can also analyze the state and the like of the microparticle using an external analysis device or the like on the basis of the detection value of light detected by the light detection unit 104. For example, the processing unit 105 may be implemented by a personal computer or a CPU, and moreover, may be stored as a program in a hardware resource including a recording medium (non-volatile memory (USB memory or the like), HDD, CD, or the like) and the like and caused to function by the personal computer or the CPU. Furthermore, the processing unit 105 may be connected to each unit of the microparticle sorting device 100 via a network.

(4) Sorting Unit 106 (Including Charging Unit 106*c*)

The sorting unit 106 includes at least a deflection plate 106*a* that changes charged droplets in a desired direction and a collection container 106*b* that collects droplets. Although separately defined in FIG. 4, a charging unit 106*c* is a part of the sorting unit 106, and performs charging on the basis of the sorting control signal generated by the processing unit 105.

In the microparticle sorting device 100 illustrated in FIG. 10, the vibration element C3 attached to the connecting member C forms a droplet by propagating vibration to the sheath liquid as described above. The charging unit 106*c* is connected to the electrode C4 inserted into the sheath liquid converging portion C21 described above, and positively or negatively charges the droplet discharged from the orifice M1 of the microchip M on the basis of the sorting control signal generated by the processing unit 105. Then, the path of the charged droplets is changed in a desired direction by the deflection plate (counter electrode) 106*a* to which a voltage is applied, and the charged droplets are sorted.

(5) Storage Unit 107

The storage unit 107 stores all items related to measurement such as the value detected by the light detection unit 103, characteristic amounts calculated by the processing unit 105, the sorting control signal, and a sorting condition input by the input unit.

In the microparticle sorting device 100, the storage unit 107 is not essential, and an external storage device may be connected. As the storage unit 107, for example, a hard disk or the like can be used. Furthermore, the recording unit 107 may be connected to each unit of the microparticle sorting device 100 via a network.

(6) Display Unit 108

The display unit 108 can display all items related to measurement such as the value detected by the light detection unit 103, and characteristic amounts calculated by the processing unit 105. Preferably, the display unit 108 displays the characteristic amounts for each microparticle calculated by the processing unit 105 as a scattergram.

In the microparticle sorting device 100, the display unit 108 is not essential, and an external display device may be connected. As the display unit 110, for example, a display, a printer, or the like can be used. Furthermore, the display unit 108 may be connected to each unit of the microparticle sorting device 100 via a network.

(7) Input Unit 109

The input unit 109 is a part to be operated by a user such as an operator. The user can access the control unit 110 described later through the input unit 109 to control each unit of the microparticle sorting device 100. The input unit 109 preferably sets a region of interest on the scattergram displayed on the display unit 108 and determines a sorting condition.

In the microparticle sorting device 100, the input unit 109 is not essential, and an external operating device may be connected. As the input unit 109, for example, a mouse, a keyboard, or the like can be used. Furthermore, the input unit 109 may be connected to each unit of the microparticle sorting device 100 via a network.

(8) Control Unit 110

The control unit 110 is capable of controlling each of the light irradiation unit 103, the light detection unit 104, the analysis unit 105, the sorting unit 106, the charging unit 106*c*, the recording unit 107, the display unit 108, and the input unit 109. The control unit 110 may be disposed separately for each unit of the microparticle sorting device 100, or may be provided outside the microparticle sorting device 100. For example, the control unit 110 may be implemented by a personal computer or a CPU, and moreover, may be stored as a program in a hardware resource including a recording medium (non-volatile memory (USB memory or the like), HDD, CD, or the like) and the like and caused to function by the personal computer or the CPU. Furthermore, the control unit 110 may be connected to each unit of the microparticle sorting device 100 via a network.

5. Fifth Embodiment (Microparticle Sorting Method)

A microparticle sorting method according to the present technology includes, in a microchip including at least a main flow path through which a liquid containing a microparticle flows, a sheath liquid flow path that communicates with the main flow path and through which a sheath liquid flows, and a sheath liquid introduction portion that introduces the sheath liquid, vibrating the sheath liquid flowing through the sheath liquid introduction portion.

Since the microparticle sorting method according to the present technology is the same as the method performed by the microparticle sorting device according to the present technology described above, the description thereof will be omitted here.

EXAMPLES

Hereinafter, the present invention will be described in more detail on the basis of an example.

Note that the example described below is an example of representative embodiments of the present invention, and the scope of the present invention is not interpreted in a narrow sense by them.

Figure 11:
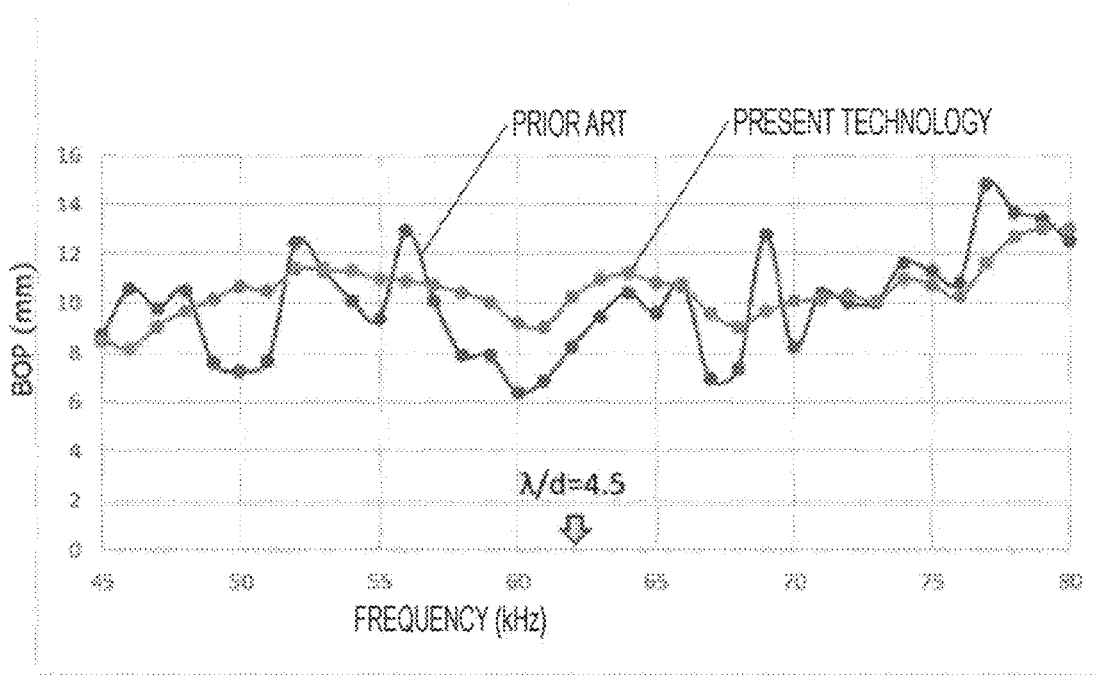
FIG. 11 is a graph illustrating a result of measuring frequency characteristics of a break-off point in a case where vibration is applied using the prior art and a break-off point in a case where vibration is applied using the present technology.

In the prior art, a microchip is vibrated by a vibration element to form droplets. FIG. 11 is a graph illustrating results of measuring frequency characteristics of a break-off point in a case where vibration is applied using this prior art and a break-off point in a case where vibration is applied using the present technology.

As illustrated in FIG. 11, it can be seen that the BOP greatly changes depending on the frequency in the prior art. This is considered to be because, as described above, a phenomenon occurs such as the vibration frequency matching the eigenvalue of the microchip and causing large vibration of the microchip (resonance, shortened BOP), or conversely canceling each other out and causing small vibration of the microchip (anti-resonance, prolonged BOP), or the like. On the other hand, in the present technology, since the vibration is not applied via the microchip and is not affected by the eigenvalue thereof, it can be seen that the change in BOP depending on the frequency becomes gentle and the generation of droplets can be stabilized.

Note that the present technology can also have the following configurations.

[1]

A microparticle sorting device, including a microchip including a main flow path through which a liquid containing a microparticle flows, a sheath liquid flow path that communicates with the main flow path and through which a sheath liquid flows, and a sheath liquid introduction portion that introduces the sheath liquid, in which the sheath liquid flowing through the sheath liquid introduction portion is vibrated.

[2]

The microparticle sorting device according to [1], further including a connecting member attachable to the microchip and having a sheath liquid introduction coupling portion coupled to the sheath liquid introduction portion.

[3]

The microparticle sorting device according to [2], in which a vibration element is attached to the connecting member.

[4]

The microparticle sorting device according to [3], in which a driving frequency of the vibration element is different from a resonance frequency of a flow path in the microchip.

[5]

The microparticle sorting device according to [4], in which a driving frequency of the vibration element is within a range of ±10% from a resonance frequency of a flow path in the microchip.

[6]

The microparticle sorting device according to any one of [3] to [5], in which the sheath liquid introduction coupling portion includes a sheath liquid converging portion having a width that gradually or partially narrows from a side of the vibration element toward a side of the sheath liquid introduction portion.

[7]

The microparticle sorting device according to [6], in which a height of the sheath liquid converging portion gradually or partially decreases from a side of the vibration element toward a side of the sheath liquid introduction portion.

[8]

The microparticle sorting device according to [7], further including a connecting part having a tubular portion that communicates with a distal end of the sheath liquid converging portion between the sheath liquid converging portion and the sheath liquid introduction portion.

[9]

The microparticle sorting device according to [8], in which a tubular member is inserted inside the tubular portion.

[10]

The microparticle sorting device according to [9], in which at least a part of the tubular portion and/or the tubular member is formed by at least one selected from the group consisting of an elastomer, a resin, and a metal.

[11]

The microparticle sorting device according to any one of [6] to [10], in which the sheath liquid converging portion is a substantially conical shape, a substantially polygonal pyramid shape, or a rotating body of an exponential function or a parabola.

[12]

The microparticle sorting device according to any one of [6] to [11], in which the sheath liquid converging portion is formed by a transparent member or a metal.

[13]

The microparticle sorting device according to any one of [6] to [12], in which an electrode is inserted into the sheath liquid converging portion.

[14]

The microparticle sorting device according to any one of [6] to [13], in which in the sheath liquid converging portion, a swirling flow that swirls the sheath liquid is generated.

[15]

The microparticle sorting device according to any one of [6] to [14], in which a sheath liquid introduction port for introducing the sheath liquid into the sheath liquid converging portion is located at a position away from a center of the sheath liquid converging portion.

[16]

A microparticle sorting device, including:

a microchip including a main flow path through which a liquid containing a microparticle flows, a sheath liquid flow path that communicates with the main flow path and supplies a sheath liquid, and a sheath liquid introduction portion that introduces the sheath liquid;

a light irradiation unit that irradiates the microparticle with light;

a light detection unit that detects light from the microparticle; and a processing unit that processes a signal obtained from the light detection unit, in which the sheath liquid flowing through the sheath liquid introduction portion is vibrated.

[17]

A microparticle sorting method including, in a microchip including at least a main flow path through which a liquid containing a microparticle flows, a sheath liquid flow path that communicates with the main flow path and through which a sheath liquid flows, and a sheath liquid introduction portion that introduces the sheath liquid, vibrating the sheath liquid flowing through the sheath liquid introduction portion.

REFERENCE SIGNS LIST

100 Microparticle sorting device
101 Sheath liquid feeding unit
102 sample liquid feeding unit
103 Light irradiation unit
104 Light detection unit
105 Processing unit
106 Sorting unit
107 Storage unit
108 Display unit
109 Input unit
110 Control unit
M Microchip
Ma, Mb Substrate layer
M1 Orifice
M11 Cutout portion
M2 Main flow path
M3 Sample liquid introduction portion
M31 Sample liquid flow path
M4 Sheath liquid introduction portion
M41 Sheath liquid flow path
M5 Suction opening
M51 Suction flow path
M52 Communication port
M61, 62 Narrowing portion
M7 Straight portion
L1 Diameter of cutout portion M11
L2 Opening diameter of orifice M1
C Connecting member
C1 Sample liquid introduction coupling portion
C2 Sheath liquid introduction coupling portion
C20 Sheath liquid introduction port C21 Sheath liquid converging portion
C211 Distal end of sheath liquid converging portion
C22 Connecting part
C22a Resin
C22b Thermoplastic elastomer
C22c O-ring
C221 Tubular portion
C222 Tubular member
C3 Vibration element
C4 Electrode

The invention claimed is:

1. A microparticle sorting device, comprising:
a microchip including:
    a main flow path configured to flow a sample liquid containing a microparticle;
    a sheath liquid flow path in communication with the main flow path and configured to flow a vibrating sheath liquid; and
    a sheath liquid inlet in communication with the sheath liquid flow path and configured to receive the vibrating sheath liquid from a connecting member.

2. The microparticle sorting device according to claim 1, further comprising:
the connecting member,
wherein:
    the connecting member is configured to attach to the microchip; and
    the connecting member has a sheath liquid inlet coupler configured to couple to to the sheath liquid inlet.

3. The microparticle sorting device according to claim 2, further comprising a vibration element attached to the connecting member.

4. The microparticle sorting device according to claim 3, wherein a driving frequency of the vibration element is different from a resonance frequency of a flow path in the microchip.

5. The microparticle sorting device according to claim 4, wherein the driving frequency of the vibration element is within a range of ±10% from the resonance frequency of the flow path.

6. The microparticle sorting device according to claim 3, wherein the sheath liquid inlet coupler includes a sheath liquid converging portion having a width that gradually or partially narrows from a side of the vibration element toward a side of the sheath liquid inlet coupler.

7. The microparticle sorting device according to claim 6, wherein a height of the sheath liquid converging portion gradually or partially decreases from a side of the vibration element toward a side of the sheath liquid inlet coupler.

8. The microparticle sorting device according to claim 7, further comprising a connecting part having a tubular portion that communicates with a distal end of the sheath liquid converging portion between the sheath liquid converging portion and the sheath liquid inlet coupler.

9. The microparticle sorting device according to claim 8, wherein a tubular member is disposed within the tubular portion.

10. The microparticle sorting device according to claim 9, wherein at least a part of the tubular portion and/or the tubular member is formed by at least one material selected from the group consisting of an elastomer, a resin, and a metal.

11. The microparticle sorting device according to claim 6, wherein the sheath liquid inlet coupler has a substantially conical shape, a substantially polygonal pyramid shape, or a shape of a rotating body of an exponential function or a parabola.

12. The microparticle sorting device according to claim 6, wherein the sheath liquid converging portion is formed by a resin, a metal, or a transparent member.

13. The microparticle sorting device according to claim 6, wherein an electrode is disposed within the sheath liquid converging portion.

14. The microparticle sorting device according to claim 6, wherein the sheath liquid converging portion is configured to generate a swirling flow that swirls the vibrating sheath liquid.

15. The microparticle sorting device according to claim 6, wherein a sheath liquid introduction port of the sheath liquid converging portion is located at a position away from a center of the sheath liquid converging portion.

16. A microparticle sorting device, comprising:
a microchip including:
    a main flow path configured to flow a sample liquid containing a microparticle;
    a sheath liquid flow path in communication with the main flow path and configured to flow a vibrating sheath liquid; and
    a sheath liquid inlet in communication with the sheath liquid flow path and configured to receive the vibrating sheath liquid from a connecting member;
a light source configured to irradiate the microparticle;
a light detector configured to detect light from the microparticle; and
a processor configured to process a signal obtained from the light detector.

17. A method for sorting microparticles in a microchip including a main flow path configured to flow a sample liquid containing a microparticle, a sheath liquid flow path in communication with the main flow path and configured to flow a vibrating sheath liquid, and a sheath liquid inlet in communication with the sheath liquid flow path and configured to receive the vibrating sheath liquid from a connecting member, the method comprising:
flowing the vibrating sheath liquid from the connecting member through the sheath liquid inlet.

18. The microparticle sorting device of claim 16, further comprising:
a connecting member configured to attach to the microchip; and
a vibration element configured to attach to the connecting member.

19. The microparticle sorting device of claim 18, wherein the microchip is configured to be:
detachable from the connecting member; and
disposable independently of the vibration element.

20. The microparticle sorting device of claim 3, wherein the vibration element is more proximate to the sheath liquid inlet than the vibration element is to the main flow path.

* * * * *